(12) United States Patent
Sun et al.

(10) Patent No.: US 12,138,807 B2
(45) Date of Patent: Nov. 12, 2024

(54) ROBOTIC SYSTEM TO CONTROL MULTIPLE ROBOTS TO PERFORM A TASK COOPERATIVELY

(71) Applicant: Dexterity, Inc., Redwood City, CA (US)

(72) Inventors: Zhouwen Sun, Redwood City, CA (US); Talbot Morris-Downing, Redwood City, CA (US); Harry Zhe Su, Union City, CA (US); Rohun Kulkarni, Palo Alto, CA (US); Kevin Jose Chavez, Redwood City, CA (US); Samir Menon, Atherton, CA (US); Toby Leonard Baker, Redwood City, CA (US); David Leo Tondreau, III, San Francisco, CA (US); Robert Holmberg, Mountain View, CA (US)

(73) Assignee: Dexterity, Inc., Redwood City, CA (US)

( * ) Notice: Subject to any disclaimer, the term of this patent is extended or adjusted under 35 U.S.C. 154(b) by 0 days.

(21) Appl. No.: 18/234,825

(22) Filed: Aug. 16, 2023

(65) Prior Publication Data
US 2024/0042613 A1    Feb. 8, 2024

Related U.S. Application Data

(63) Continuation of application No. 17/978,600, filed on Nov. 1, 2022, now Pat. No. 11,772,269.
(Continued)

(51) Int. Cl.
*B25J 9/16*    (2006.01)
*B25J 9/00*    (2006.01)
(Continued)

(52) U.S. Cl.
CPC ........... *B25J 9/1682* (2013.01); *B25J 9/0087* (2013.01); *B25J 9/1669* (2013.01); *B25J 9/1697* (2013.01); *B25J 13/08* (2013.01); *B25J 15/0616* (2013.01)

(58) Field of Classification Search
CPC ...... B25J 9/0087; B25J 9/1669; B25J 9/1682; B25J 9/1697; B25J 13/08; B25J 15/0616
See application file for complete search history.

(56) References Cited

U.S. PATENT DOCUMENTS

| | | |
|---|---|---|
| 6,330,493 B1 | 12/2001 | Takahashi |
| 10,192,195 B1 | 1/2019 | Brazeau |

(Continued)

FOREIGN PATENT DOCUMENTS

| | | |
|---|---|---|
| CN | 105751196 | 7/2016 |
| CN | 112264852 | 1/2021 |

(Continued)

OTHER PUBLICATIONS

Miyazaki et al., Object Placement Estimation with Occlusions and Planning of Robotic Handling Strategies, 2017 IEEE International Conference on Advanced Intelligent Mechatronics, Jul. 7, 2017, pp. 602-607.

(Continued)

*Primary Examiner* — Dale Moyer
(74) *Attorney, Agent, or Firm* — Van Pelt, Yi & James LLP

(57) ABSTRACT

A robotic system to control multiple robots to perform a task cooperatively is disclosed. A first robot determines to perform a task cooperatively with a second robot, moves independently to a first grasp position to grasp an object associated with the task, receives an indication that the second robot is prepared to perform the task cooperatively, and moves the object independently of the second robot in (Continued)

a leader mode along a trajectory determined by the first robot. The second robot assists the first robot in performing the task cooperatively, at least in part by moving independently to a second grasp position, grasping the object, and cooperating with the first robot to move the object, at least in part by operating in a follower mode of operation to maintain engagement with the object as the first robot moves the object along the trajectory.

20 Claims, 5 Drawing Sheets

Related U.S. Application Data

(60) Provisional application No. 63/274,461, filed on Nov. 1, 2021.

(51) Int. Cl.
  *B25J 13/08* (2006.01)
  *B25J 15/06* (2006.01)

(56) References Cited

U.S. PATENT DOCUMENTS

| | | |
|---|---|---|
| 2002/0029095 A1 | 3/2002 | Kosaka |
| 2005/0027394 A1* | 2/2005 | Graf ................ B25J 9/1682 700/245 |
| 2005/0055132 A1* | 3/2005 | Matsumoto ........ B25J 9/1682 700/245 |
| 2009/0055024 A1 | 2/2009 | Kay |
| 2015/0352721 A1 | 12/2015 | Wicks |
| 2016/0031084 A1 | 2/2016 | Yamazaki |
| 2016/0346918 A1 | 12/2016 | Inutake |
| 2018/0161979 A1 | 6/2018 | Okamoto |
| 2018/0362270 A1 | 12/2018 | Clucas |
| 2019/0047148 A1 | 2/2019 | Fremuth |
| 2019/0047149 A1 | 2/2019 | Wouhaybi |
| 2019/0315582 A1 | 10/2019 | Criswell |
| 2020/0055195 A1 | 2/2020 | Ignakov |
| 2020/0115174 A1 | 4/2020 | Bangalore Srinivas |
| 2020/0165074 A1 | 5/2020 | Wagner |
| 2020/0171650 A1* | 6/2020 | Hallock ............ B25J 9/009 |
| 2020/0405417 A1 | 12/2020 | Shelton, IV |
| 2021/0046656 A1 | 2/2021 | Biswas |
| 2021/0122035 A1 | 4/2021 | Furlan |
| 2021/0229281 A1 | 7/2021 | Natarajan |
| 2022/0371186 A1* | 11/2022 | Zhang ............... B25J 9/0084 |

FOREIGN PATENT DOCUMENTS

| | | | |
|---|---|---|---|
| CN | 112296995 | 2/2021 | |
| CN | 111515949 | 8/2021 | |
| CN | 111515949 B * | 8/2021 | ........... B25J 9/0087 |
| CN | 113427483 | 9/2021 | |
| DE | 102019102470 | 8/2020 | |
| DE | 102016107268 | 2/2022 | |
| JP | H1083208 | 3/1998 | |
| JP | H1083208 A * | 3/1998 | ............ B25J 13/00 |
| WO | 2014128493 | 8/2014 | |
| WO | 2018091103 | 5/2018 | |

OTHER PUBLICATIONS

Romano et al., Human-Inspired Robotic Grasp Control With Tactile Sensing, IEEE Transactions On Robotics, vol. 27, No. 6, Dec. 2011, pp. 1067-1079.

* cited by examiner

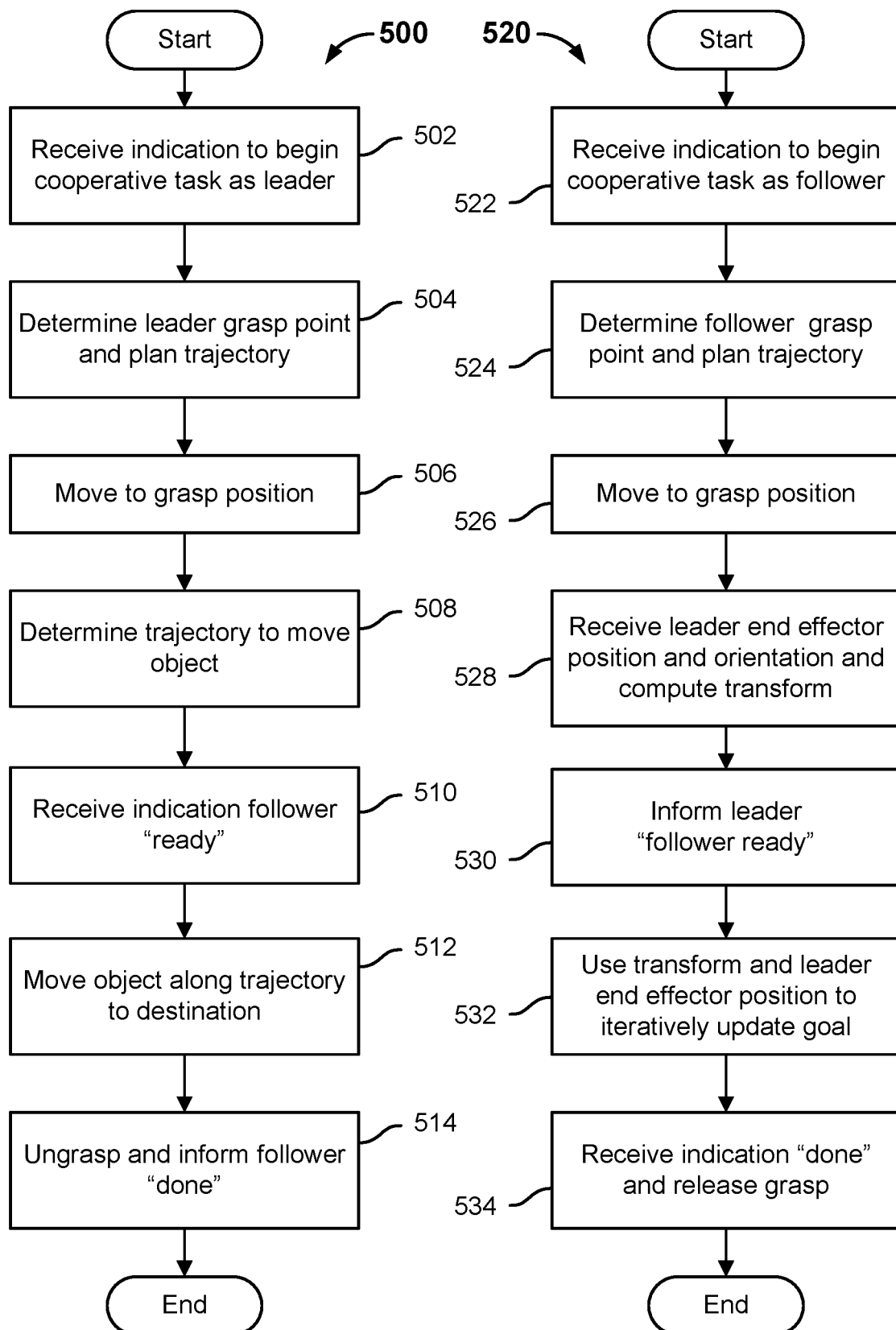

ROBOTIC SYSTEM TO CONTROL MULTIPLE ROBOTS TO PERFORM A TASK COOPERATIVELY

CROSS REFERENCE TO OTHER APPLICATIONS

This application is a continuation of U.S. patent application Ser. No. 17/978,600 entitled ROBOTIC SYSTEM TO CONTROL MULTIPLE ROBOTS TO PERFORM A TASK COOPERATIVELY filed Nov. 1, 2022, which claims priority to U.S. Provisional Patent Application No. 63/274,461 entitled ROBOTIC SYSTEM TO CONTROL MULTIPLE ROBOTS TO PERFORM A TASK COOPERATIVELY filed Nov. 1, 2021, each of which is incorporated herein by reference for all purposes.

BACKGROUND OF THE INVENTION

Robots have been provided to perform a variety of tasks, such as manipulating objects. For example, a robotic arm having an end effector may be used to pick and place items. Examples of commercial applications of such robots include sortation, kitting, palletization, depalletization, truck or container loading and unloading, etc.

In some contexts, the objects to be handled vary considerably in size, weight, packaging, and other attributes. Typically, a robotic arm is rated to handle up to a maximize size, weight, etc. of object. In some contexts, the conventional approach may require a robotic arm able to handle the largest, heaviest, and/or otherwise most difficult object that may be required to be handled.

BRIEF DESCRIPTION OF THE DRAWINGS

Various embodiments of the invention are disclosed in the following detailed description and the accompanying drawings.

FIG. 5A is a flow diagram illustrating an embodiment of a process to cooperatively perform a task as a "leader" robot in an embodiment of a robotic system as disclosed herein.

FIG. 5B is a flow diagram illustrating an embodiment of a process to cooperatively perform a task as a "follower" robot in an embodiment of a robotic system as disclosed herein.

DETAILED DESCRIPTION

Figure 1:
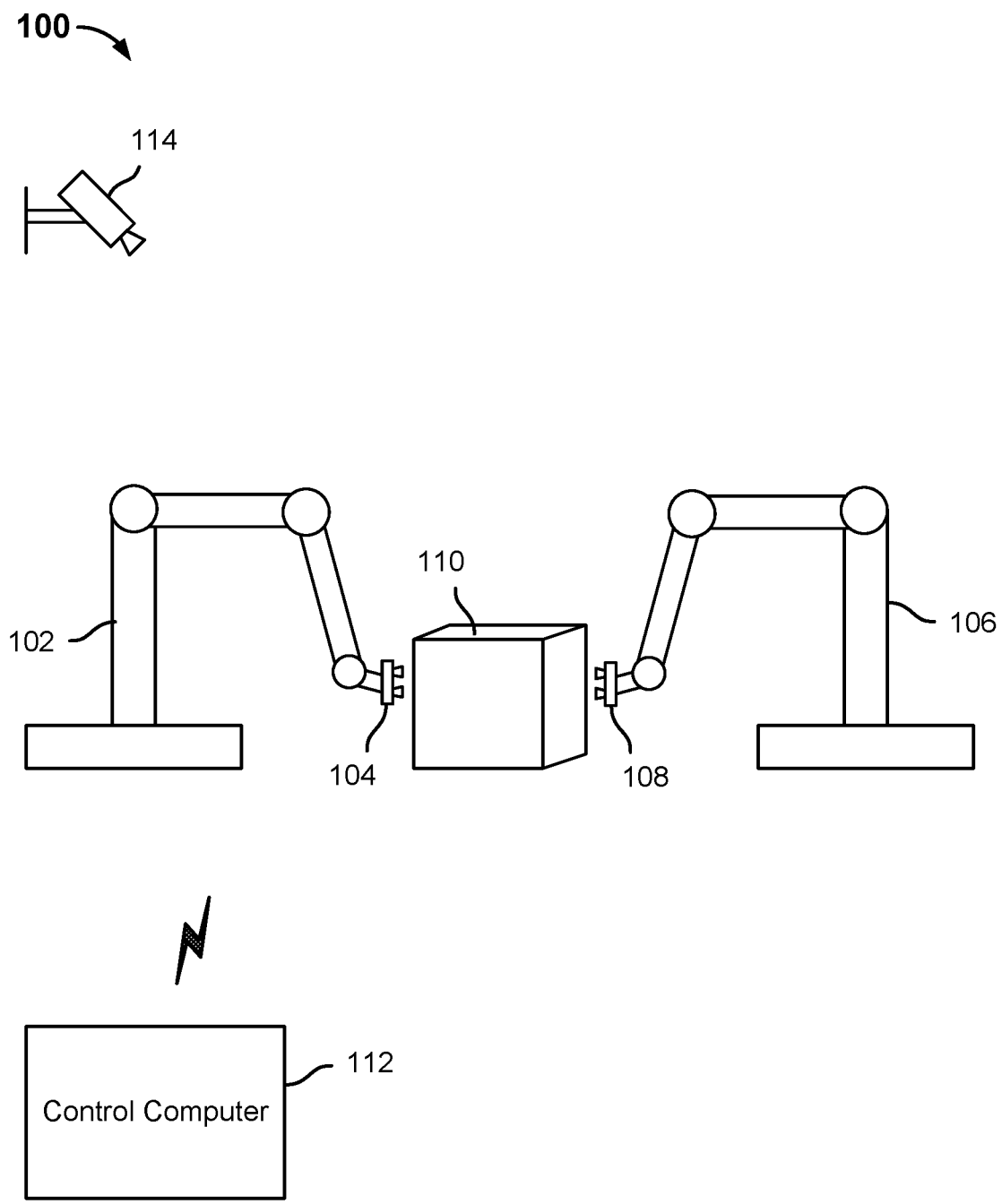
FIG. 1 is a block diagram illustrating an embodiment of a robotic system configured to control a plurality of robots to perform a task cooperatively.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A robotic system is disclosed to control two or more robots, e.g., robotic arms each terminated with an end effector, such as a suction or gripper type end effector, to work cooperatively to perform a task, such as to grasp and move a package or other payload. In various embodiments, robots work independently to pick/place items the robots can grasp and move without using multiple robots. Payloads that are too large, heavy, awkwardly shaped, etc. to be moved by a single robot are moved by two or more robots working in cooperation as disclosed herein.

In various embodiments, multiple robots independently plan and execute motion trajectories for picking and grasping packages. A determination is made to use two or more robots to move a payload cooperatively. For example, an attribute of the payload may be known by the robotic control system, e.g., based on a classification of the payload using computer vision. For example, image data may be used to classify the payload by type, and a weight or other attribute of a payload of that type may be used to decide to use multiple robots to move the item. Or, a single robot may attempt to grasp the item, e.g., with a suction-based end effector, and may not be able to lift the item, or maintain a secure grip. In some embodiments, attributes and/or grasping strategies (e.g., single robot, multi-robot) are learned by the system over time, e.g., based on prior experience attempting to grasp and move a similar item and/or items of the same type.

In various embodiments, to use multiple robots to move an item, a single leader robot independently plans a package trajectory, e.g., in the leader robot frame, to move and place package, e.g., at a destination location. A planner, scheduler, or other application or module may signal the beginning of a collaborative place. One or more follower robots receive the signal, and in response each records a transformation from its follower end-effector position and orientation to the leader's end-effector positions and orientation. For example, for a two-robot pick/place of a rectangular box, a single follower may determine a transform to achieve and maintain a position and orientation that is opposite the leader's end effector at a distance corresponding to a dimension of the box across which the two robots will grasp the box cooperatively, e.g., by suction, each at a corresponding opposite side of the box.

In various embodiments, at each time step in the place motion, the follower receives an update of the leader's end-effector position and orientation and uses the previously determined transform to recompute its goal position and orientation, e.g., to maintain the initial transformation from the leader. The follower uses operational-space control (e.g., computes and applies robotic arm joint motor torques necessary) to minimize the error between its current end-effector position and orientation and its recomputed goal position.

In some embodiments, once the follower robot has its end effector in the position and orientation opposite the leader robot and both (or all) robots have the package in their grasp, velocity control may be used to move the end effectors synchronously and maintain the position and orientation of the follower end effector relative to the leader.

In various embodiments, a force controller is used to maintain contact force and torque between the leader and follower robots. In some embodiments, the force controller is used to prevent translational and rotational slippages between robots and the picked object and guarantee the object pose between the robot leader and follower.

In some embodiments, to achieve precise placement, the object pose is controlled precisely. The object pose is estimated based on the leader and follower's end-effector poses as well as the contact forces and torques throughout the pick and place trajectories.

FIG. 1 is a block diagram illustrating an embodiment of a robotic system configured to control a plurality of robots to perform a task cooperatively. In the example shown, system and environment 100 includes a first robotic arm 102 equipped with a suction-type end effector 104 and a second robotic arm 106 equipped with a suction-type end effector 108. In the state shown, robotic arm 102 and robotic arm 106 are positioned to perform cooperatively a pick and place task with respect to a large box 110. A control computer 112 is configured to communicate wirelessly with one or more of the robotic arm 102, robotic arm 106, and one or more cameras or other sensors 114 in the workspace. Image data received from camera 114, for example, may be used by the control computer 112 to generate a three-dimensional view of the workspace and to send commands and information to the robotic arm 102 and robotic arm 106, as appropriate, to facilitate the cooperative pick and place task.

Figure 2A:
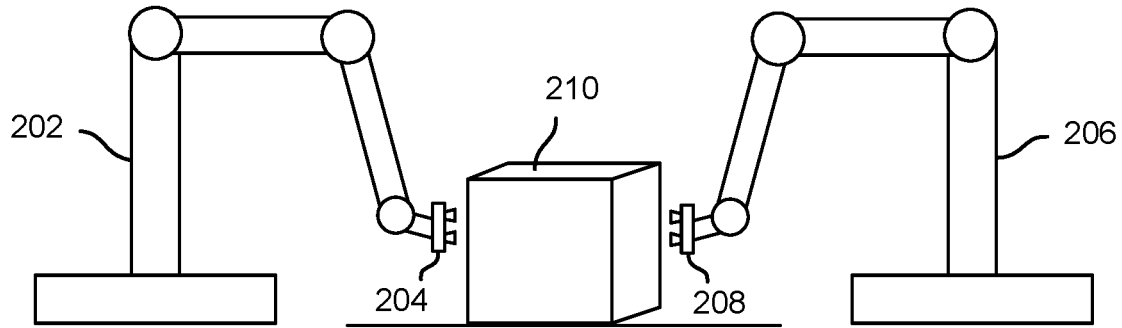
FIGS. 2A-2C illustrate an example of a cooperative pick and place task performed in an embodiment of a robotic system as disclosed herein.
Figure 2B:
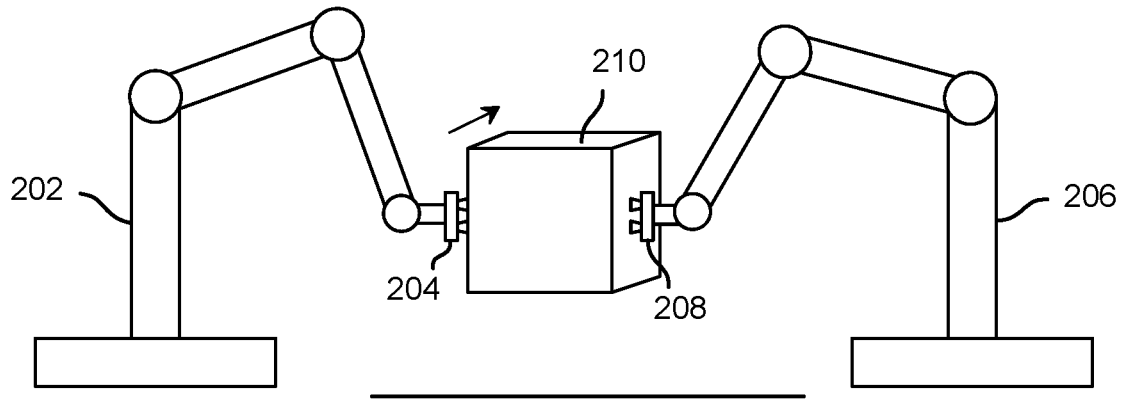
Figure 2C:
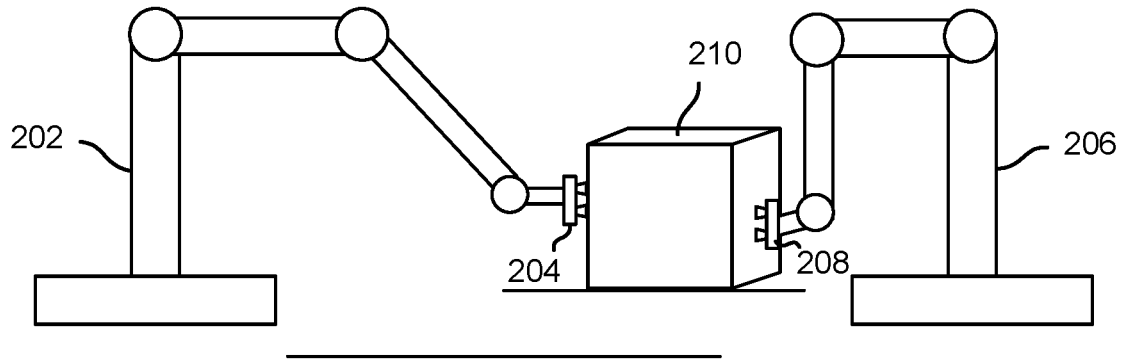

FIGS. 2A-2C illustrate an example of a cooperative pick and place task performed in an embodiment of a robotic system as disclosed herein. In the example shown, in FIG. 2A robotic arm 202 with suction type end effector 204 and robotic arm 206 with suction type end effector 208 are positioned to begin to perform cooperatively a pick and place task with respect to large box 210, similar to the starting state shown in FIG. 1. In various embodiments, robotic arm 202 may be the "leader" and robotic arm 206 the "follower" in a cooperative pick and place as disclosed herein. The "leader" may be selected by any suitable method, such as by assigning the "leader" role to the robot that initiated the cooperative task, by assigning the role randomly to one or the other of the participating robots, by an "election" or other selection method.

To initiate the operation, in various embodiments, as "leader" robotic arm 202 would move its end effector 204 to the position shown and would then grasp the box 210, e.g., by moving the end effector 204 into a position in contact or nearly in contact with the side of box 210 and applying suction. A signal may be sent to the other robot (and/or a process to control the other robot) to indicate that the leader has completed its grasp. The follower, e.g., robotic arm 206 in this example, would then grasp the box 210, e.g., at a side opposite from the side at which the leader (i.e., robotic arm 202) had grasped the box 210. The follower would record a transform based on the position and orientation of the leader's end effector 204 and the relevant dimension of box 210. For example, the vision system and/or other sensors may be used to measure the dimension, or to recognize the box 210 (e.g., specifically and/or by type) and to use the item and/or type information to determine the dimension, e.g., by look up.

As shown in FIG. 2B, once both robots (202, 206) have grasped box 210. The leader, robotic arm 202 in this example, computes and moves the box along a trajectory determined by robotic arm 202 (and/or a control process associated therewith) independently of the follower robotic arm 206. In various embodiments, the follower robot, robotic arm 206 in this example, receives (e.g., periodically, continuously, etc.) position and orientation information for the end effector 204 of leader robotic arm 202. The follower robotic arm 206 (and/or a control process associated therewith) uses the position and orientation information of the leader robot (202, 204) and the previously-determined and recorded transform to compute a new target position and orientation for the follower's end effector 208, and computes and applies torques to motors comprising robotic arm 206 as needed to minimize the error (difference) between the current position and orientation of the follower's end effector 208 and the (most recently updated) target.

Once the object (box 210) has been placed in the destination position, as shown in FIG. 2C for example, the leader robot (robotic arm 202) releases its grasp and informs the follower that the pick and place task has been completed. In response, the follower (robotic arm 206) releases its grasp and both robots (202, 206) are free to perform other work, such as (returning to) independently picking and placing smaller/lighter objects and/or cooperatively performing a next pick and place task for another large or heavy object.

Figure 3:
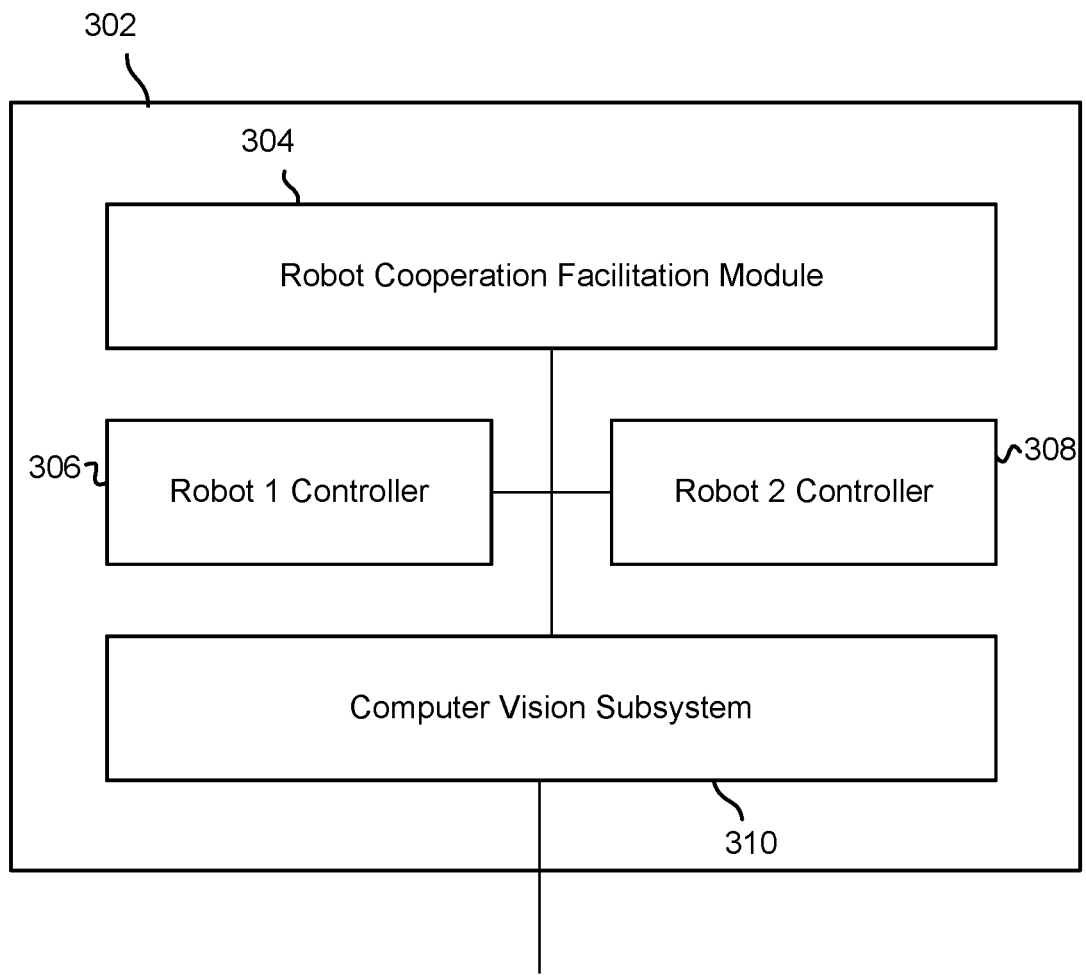
FIG. 3 is a block diagram illustrating an embodiment of a robotic control system.

FIG. 3 is a block diagram illustrating an embodiment of a robotic control system. In various embodiments, the robotic control system 302 of FIG. 3 includes or is included in the control computer 112 of FIG. 1. In various embodiments, one or more modules or subsystems comprising the robotic control system 302 of FIG. 3 may be distributed across multiple computing nodes, such as computers and/or processors comprising one or more of control computer 112, robotic arm 102, and/or robotic arm 106 of FIG. 1.

In the example shown, robotic control system 302 includes a hierarchical planner, scheduler, and/or control module comprising a robot cooperation facilitation module 304 configured to facilitate cooperative performance of tasks by two or more robots, as disclosed herein, and robot-specific controllers 306 and 308. For example, robot 1 controller 306 may be associated with robotic arm 102 of FIG. 1 and/or robotic arm 202 of FIGS. 2A through 2C, while robot 2 controller 308 may be associated with robotic arm 106 of FIG. 1 and/or robotic arm 206 of FIGS. 2A through 2C.

In various embodiments, the respective robots associated with robot 1 controller 306 and robot 2 controller 308, respectively, each may operate independently, e.g., to pick and place objects the robot is able to handle singly. In various embodiments, cooperative tasks using two or more robots may be initiated and/or performed by one or more of communications sent between robot 1 controller 306 and robot 2 controller 308; bilateral communications between robot cooperation facilitation module 304, on the one hand, and the respective robot 1 controller 306 and robot 2 controller 308, on the other; and/or communications among all three (or more) entities.

In the example shown, robotic control system 302 further includes a computer vision subsystem 310 configured to receive image and depth data from one or more 3D cameras and/or other sensors, such as camera 114 of FIG. 1, and to use the received data to generate and/or update a three-dimensional view of the workspace. The output of the computer vision subsystem 310 may be provided to one or more of the robot cooperation facilitation module 304, robot 1 controller 306, and robot 2 controller 308, to enable them to initiate and perform cooperatively a task to pick and place an item. For example, image data may be used to determine that a box or other object is too large and/or too heavy for a single robot to pick and place. The three-dimensional view of the workspace and objects within may also be used to determine respective grasp strategies and/or locations for each robot, to determine collision-free trajectories to move each robot's end effector to its corresponding pick location, and to determine a collision-free trajectory through which to cooperatively move the object to the destination location at which it is to be placed, for example.

Figure 4:
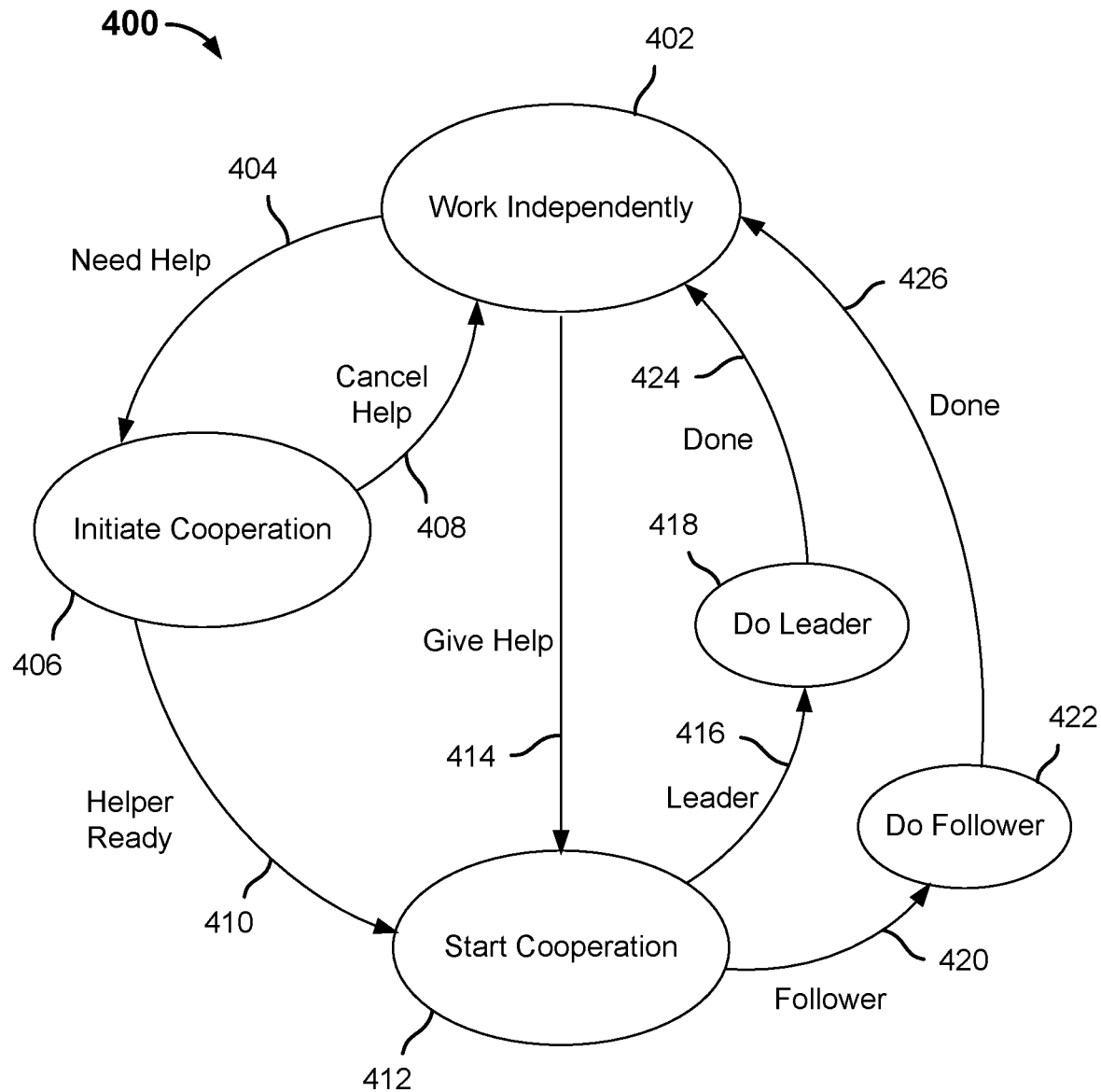
FIG. 4 is a state diagram illustrating an embodiment of a robotic system configured to control a plurality of robots to perform a task cooperatively.

FIG. 4 is a state diagram illustrating an embodiment of a robotic system configured to control a plurality of robots to perform a task cooperatively. In various embodiments, the state diagram 400 of FIG. 4 may be implemented by and/or with respect to a robot configured to cooperatively perform an operation using two or more robots. In some embodiments, the state diagram 400 of FIG. 4 may be implemented by control computer 112 of FIG. 1 and/or one or more of robot cooperation facilitation module 304, robot 1 controller 306, and robot 2 controller 308 of FIG. 3.

In the example shown, in state 402 a robot works independently to perform tasks. For example, the robot may independently pick and place items, such as to fill a box or other receptacle in a kitting operation, place items on a conveyer belt or other conveyance in a sortation operation, stack items on a pallet, etc. Upon receiving an indication that help is needed to perform a task (404), such as an indication that an item that has been perceived and which needs to be picked and placed is too large to grasp and move with one robot, the robot and/or controller transitions to a state 406 in which cooperative performance of the task is initiated. For example, a communication may be sent to another robot (e.g., from robot 1 controller 306 to robot 2 controller 308 of FIG. 3) or to a higher-level planner/scheduler (e.g., robot cooperation facilitation module 304 of FIG. 3), or the higher-level planner/scheduler may recognize the need for cooperative performance of the task and may initiate the transition to state 406.

In the example shown, the robot and/or controller may transition back to working independently in state 402, via a "cancel help" transition 408. For example, the robot/controller and/or a higher-level planner/scheduler may determine that the task has already been performed by and/or assigned to one or more other robots.

In some embodiments, in the "initiate cooperation" state 406, the robot/controller that is initiating cooperative performance of the task communicates directly or indirectly with a helper robot, e.g., by requesting help. Another robot may be assigned to help and/or may agree to help. The robot may be assigned and/or agree to help at a future time or upon occurrence of a future condition, such as completion of a task the helper robot has already started and/or a task that has higher priority. For example, a task to clear other objects from around the large or heavy object, to facilitate the cooperative task, may have a higher priority and therefore may be completed first. Once the helper robot is ready to perform the cooperative task, the helper robot informs the task initiator, directly or indirectly (e.g., via a higher-level planner/scheduler, such as robot cooperation facilitation module 304 of FIG. 3), that the helper robot is ready, prompting a transition 410 to "start cooperation" state 412. The helper may transition directly from working independently, in state 402, to "start cooperation" state 412, via the "give help" transition 414 in the example shown.

Once all participating robots are ready in the "start cooperation" state 412, a "leader" is determined, if needed, and the leader transitions (416) to "do leader" state 418 while the follower(s) transition (420) to "do follower" state 422. In the "do leader" state 418 and "do follower" state 422, the leader and follower(s) cooperate as disclosed herein to cooperative perform the task, such as to pick and place a large or heavy object, as in the example illustrated in FIG. 2A through 2C. Once the task has been completed, the leader and follower(s) transition (424, 426) back to the "work independently" state 402 and resume working independently.

FIG. 5A is a flow diagram illustrating an embodiment of a process to cooperatively perform a task as a "leader" robot in an embodiment of a robotic system as disclosed herein. In various embodiments, process 500 of FIG. 5A may be implemented by a robot controller associated with a robot that is participating as the "leader" in cooperative performance of a task by two or more robots as disclosed herein.

In the example shown, at 502 an indication to begin a cooperative task (with one or more other robots) in the role of "leader" is received. For example, an indication to cooperatively perform a pick and place task may be received. At 504, the leader determines a location at which to grasp the object and plans a trajectory to safely move its end effector into position to grasp the object and at 506 the leader moves its end effector along the trajectory to the grasp position. At 508, the leader determines (independently of any other robot) a trajectory to move the object to an associated destination. For example, a model of the robot and its kinematics and image and/or other information about the workspace (e.g., configuration data, CAD files, etc.), one or more attributes of the object (e.g., dimensions, rigidity, etc.), and image/sensor data may be used to plan the trajectory. At 510, an indication is received from the "follower" robot(s) with which the robot implement process 500 is to cooperate that the follower robot(s) is/are ready to begin cooperative performance of the task. In response, at 512 the "leader" robot moves its end effector (and the object in the joint grasp of the leader and follower(s)) to the destination along the trajectory determined by the leader. At 514, upon placing the object at the destination the leader robot releases its grasp and informs the follower robot(s) that the task has been completed. In various embodiments, the leader then resumes operating independently.

FIG. 5B is a flow diagram illustrating an embodiment of a process to cooperatively perform a task as a "follower" robot in an embodiment of a robotic system as disclosed herein. In various embodiments, process 520 of FIG. 5B may be implemented by a robot controller associated with a robot that is participating as the "follower" in cooperative performance of a task by two or more robots as disclosed herein.

In the example shown, at 522 an indication is received to begin performing a task cooperatively with one or more other robots in the "follower" role, as disclosed herein. At 524, the follower determines a grasp point—e.g., one on an opposite side of the object from the side at which the "leader" has indicated it will grasp the object—and plans a trajectory to move into position to grasp the object at that point. At 526, the follower moves its end effector to the determined grasp position and grasps the object, e.g., in response to receiving an indication that the leader has completed its grasp. At 528, the leader's end effector position and orientation information are received, and the follower uses this information along with information about the object (e.g., the size of the object in the dimension that separates the leader's end effector and the follower's end effector) and computes a transform. In various embodiments, the transform comprises a matrix or other mathematical construct that can be applied to the position and orientation of the leader's end effector, typically expressed in the leader's frame of reference, to provide a corresponding position and orientation for the follower's end effector that would maintain the relative position and orientation of the follower's end effector with respect to the leader's end effector as the end effectors and the object grasped between them are moved through the workspace to the destination at which the object is to be placed. At 530, the follower robot informs the leader that the follower is "ready", e.g., the follower has grasped the objected, computed the transform, and is ready to maintain the position of its end effector relative to (e.g., opposite) the leader's end effector.

At 532, as the leader robot begins to move along the trajectory determined independently by the leader, the follower uses the transform it computed and successively received position and orientation information for the leader's end effector, as it is moved through the workspace. For example, for each of at least a subset of the received positions and/or orientations of the leader's end effector, the follower computes a new goal position and/or orientation for its own end effector and applies torques to it motors as determined to be needed to minimize the error (e.g., difference) between the current position and/or orientation of its end effector and the current goal.

At 534, the follower receives an indication (e.g., from the leader) that the cooperative task is "done", in response to which the follower releases its grasp and the process 520 ends.

In various embodiments, techniques disclosed herein may be used to enable a robotic system to perform a wider variety of tasks with respect to a wider range of objects, e.g., by using two or more robots to perform a task cooperatively.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a communication interface associated with a first robot having a first end effector, the communication interface configured to:
      receive from a second robot an indication to begin a cooperative task of moving an object in a follower mode of operation; and
      receive from the second robot an end effector position and orientation of a second end effector associated with the second robot relative to the object associated with the cooperative task; and
   a processor associated with the first robot coupled to the communication interface and configured to:
      determine a first grasp point for the object based on a second grasp point at which the second robot has indicated it will grasp the object;
      cause a robotic arm of the first robot having the first end effector to move to the first grasp point to grasp the object; and
      compute a new target position and orientation for the first end effector based in part on the received end effector position and the received orientation information of the second end effector of the second robot relative to the object associated with the cooperative task and information about the object associated with the cooperative task.

2. The system of claim 1, wherein the second robot is in a leader mode of operation.

3. The system of claim 1, wherein the processor is further configured to plan a trajectory to move the first end effector to the first grasp point.

4. The system of claim 1, wherein the first grasp point is on an opposite side of the object from a side at which the second robot has indicated it will grasp the object.

5. The system of claim 1, wherein the information about the object associated with the cooperative task includes a size of the object in a dimension that separates the second end effector and the first end effector.

6. The system of claim 1, wherein the processor is further configured to cause torque to be applied to one or more motors based on the computed new target position and orientation for the first end effector.

7. The system of claim 6, wherein the applied torque minimizes a difference between a current position and/or orientation of the first end effector, and the new target position and orientation.

8. The system of claim 1, wherein the processor is further configured to provide to the second robot an indication that the object has been grasped and the first end effector is ready to maintain its position relative to the second end effector associated with the second robot.

9. The system of claim 1, wherein the communication interface is further configured to receive from the second robot an indication that the cooperative task of moving the object has been completed.

10. The system of claim 1, wherein the processor is further configured to cause the grasp of the object to be released in response to receiving the indication that the cooperative task of moving the object has been completed.

11. The system of claim 1, wherein the first end effector is a suction type end effector.

12. The system of claim 1, wherein the first end effector is a gripper type end effector.

13. The system of claim 1, wherein the processor is further configured to compute a transform to be applied to the received end effector position and the received orientation.

14. The system of claim 1, wherein the processor is further configured to use velocity control to match a corresponding velocity of the second end effector associated with the second robot.

15. The system of claim 1, wherein the processor is further configured to use force control to maintain engagement of the first end effector with the object as the object is moved through a trajectory.

16. A method, comprising:
   receiving by a first robot from a second robot an indication to begin a cooperative task of moving an object in a follower mode of operation;
   determining a first grasp point for the object based on a second grasp point at which the second robot has indicated it will grasp the object;
   moving a robotic arm associated with the first robot having a first end effector to the first grasp point to grasp the object;
   receiving from the second robot an end effector position and orientation of a second end effector associated with the second robot relative to the object associated with the cooperative task; and
   computing a new target position and orientation for the first end effector associated with the first robot based in part on the received end effector position and the received orientation information of the second end effector associated with the second robot relative to the object associated with the cooperative task and information about the object associated with the cooperative task.

17. The method of claim 16, wherein the second robot is in a leader mode of operation.

18. The method of claim 16, further comprising planning a trajectory to move the first end effector associated with the first robot to the first grasp point.

19. The method of claim 16, wherein the first grasp point is on an opposite side of the object from a side at which the second robot has indicated it will grasp the object.

20. A computer program product embodied in a non-transitory computer readable medium and comprising computer instructions for:
   receiving by a first robot from a second robot an indication to begin a cooperative task of moving an object in a follower mode of operation;
   determining a first grasp point for the object based on a second grasp point at which the second robot has indicated it will grasp the object;
   moving a robotic arm associated with the first robot having a first end effector to the first grasp point to grasp the object;
   receiving from the second robot an end effector position and orientation of a second end effector associated with the second robot relative to the object associated with the cooperative task; and
   computing a new target position and orientation for the first end effector associated with the first robot based in part on the received end effector position and the received orientation information of the second end effector associated with the second robot relative to the object associated with the cooperative task and information about the object associated with the cooperative task.

\* \* \* \* \*